(12) United States Patent
Liu

(10) Patent No.: US 12,397,837 B2
(45) Date of Patent: Aug. 26, 2025

(54) DUMP TRUCK

(71) Applicant: QINGDAO HUATIAN HAND TRUCK CO., LTD., Qingdao (CN)

(72) Inventor: Zhijun Liu, Qingdao (CN)

(73) Assignee: QINGDAO HUATIAN HAND TRUCK CO., LTD., Qingdao (CN)

( * ) Notice: Subject to any disclaimer, the term of this patent is extended or adjusted under 35 U.S.C. 154(b) by 119 days.

(21) Appl. No.: 17/760,779

(22) PCT Filed: Aug. 3, 2021

(86) PCT No.: PCT/CN2021/110199
§ 371 (c)(1),
(2) Date: Dec. 15, 2022

(87) PCT Pub. No.: WO2022/257256
PCT Pub. Date: Dec. 15, 2022

(65) Prior Publication Data
US 2024/0109574 A1 Apr. 4, 2024

(30) Foreign Application Priority Data

Jun. 11, 2021 (CN) .......................... 202121307420.6

(51) Int. Cl.
*B62B 3/08* (2006.01)
*B62B 3/00* (2006.01)
*B62B 5/06* (2006.01)
(52) U.S. Cl.
CPC ................ *B62B 3/08* (2013.01); *B62B 3/001* (2013.01); *B62B 5/067* (2013.01)

(58) Field of Classification Search
CPC ......... B62B 3/08; B62B 2203/07; B62B 3/04; B62B 2203/10; B62B 5/06;
(Continued)

(56) References Cited

U.S. PATENT DOCUMENTS 10,988,153 B1 * 4/2021 Horowitz ................ B62B 7/008
2020/0247447 A1 * 8/2020 Foley ...................... B62B 3/007

FOREIGN PATENT DOCUMENTS

CN  201882120 U  6/2011
CN  204845656 U  9/2015
(Continued)

OTHER PUBLICATIONS

International Search Report and Written Opinion of PCT/CN2021/110199, Mailed Aug. 3, 2021.

*Primary Examiner* — Amy R Weisberg
*Assistant Examiner* — Philip Charles Adams
(74) *Attorney, Agent, or Firm* — Birchwood IP

(57) ABSTRACT

A dump truck is provided, which includes a vehicle frame and a vehicle body hinged on the vehicle frame, a front wheel installation shaft and a rear wheel installation shaft respectively arranged on front and rear ends of the vehicle frame, and wheels installed on the front wheel installation shaft and the rear wheel installation shaft, a connecting plate fixedly installed below a rear end of the vehicle body, and a body rotation shaft fixed below the connecting plate, the connecting plate and the vehicle frame are rotatably connected through the body rotation shaft, and the body rotation shaft is arranged directly above the rear wheel installation shaft.

9 Claims, 7 Drawing Sheets

(58) Field of Classification Search
CPC ....... B62B 2203/70; B62B 3/104; B62B 1/24; B62B 3/12; B62B 1/186; B62B 2205/20; B62B 2301/14; B65G 7/08; B65G 65/25; B65G 65/24; B65G 57/20; B65G 1/08; B65G 7/00; B60P 1/16; B60P 1/04; B60P 1/28; B60P 1/283; B60P 1/286; B60P 1/24; B60P 1/08; B60P 1/34; B60P 1/6418; B62D 1/12
USPC .......................................................... 298/2
See application file for complete search history.

(56) References Cited

FOREIGN PATENT DOCUMENTS

| | | |
|---|---|---|
| CN | 207360379 U | 8/2017 |
| CN | 206750698 U | 12/2017 |
| CN | 210390904 U | 4/2020 |

\* cited by examiner

DUMP TRUCK

CROSS-REFERENCE TO RELATED APPLICATIONS

The present application is a 35 U.S.C. § 371 National Phase conversion of International (PCT) Patent Application No. PCT/CN2021/110199 filed Aug. 3, 2021, which claims foreign priority of Chinese Patent Application No. 202121307420.6, filed on Jun. 11, 2021 in the State Intellectual Property Office of China, the contents of all of which are hereby incorporated by reference.

TECHNICAL FIELD

The present disclosure relates to the technical filed of dump truck, and in particular to a new type of dump truck.

BACKGROUND

Dump truck is a kind of vehicle for short-distance transportation of materials with a tippable body. Due to its low cost, simple maintenance, convenient operation and wide application, it is suitable for short-distance transportation of sand, earth, coal, ore or other bulk materials. Transport is a very practical transport device in the process of daily handling of objects. Most of the existing dump trucks use a rotating shaft to connect the body to the frame. Since the body is usually made of a plastic one-piece material, the connection point with the rotating shaft is usually not resistant to wear and tear, resulting in serious wear and tear of the connection point after using the tipping function for a long time, thus increasing the replacement frequency of the body. Moreover, most of the existing dump trucks are designed to be pushed by hand, so it is not convenient to use a trailer hook for towing when heavy goods are loaded in the truck.

Therefore, the existing technology still needs to be further developed and improved.

SUMMARY

In view of various deficiencies of the prior art, in order to solve the above problems, a new type of dump truck is proposed. The present disclosure provides the following technical solutions:

A new type of dump truck, comprises a vehicle frame and a vehicle body hinged on the vehicle frame, a front wheel installation shaft and a rear wheel installation shaft respectively arranged on front and rear ends of the vehicle frame, and wheels installed on the front wheel installation shaft and the rear wheel installation shaft, a connecting plate fixedly installed below the rear end of the vehicle body, and a body rotation shaft fixed below the connecting plate, the connecting plate and the vehicle frame are rotatably connected through the body rotation shaft, and the body rotation shaft is arranged directly above the rear wheel installation shaft.

Further, a connecting frame is fixed below the connecting plate, the body rotation shaft is arranged on the connecting frame, and the connecting plate is connected with the body rotation shaft through the connecting frame.

Further, the connecting frame is a V-shaped connecting frame, comprising a first straight rod vertically arranged, an second straight rod inclined arranged, and a connecting curved rod connecting both ends of the first straight rod and the second straight rod, the first straight rod, the connecting curved rod and the second straight rod are jointly enclosed to form the V-shaped connecting frame, and the body rotation shaft is arranged at the connection between the first straight rod and the connecting curved rod.

Further, the connecting plate is two corner plates, and the two corner plates are respectively arranged above the rear wheel installation shaft.

Further, the rear end of the vehicle frame extends downward to form two rear wheel installation frames, and the body rotation shaft and the rear wheel installation shaft are arranged up and down and mounted on the rear wheel installation frames.

Further, the rear wheel installation shaft is a single long rotating shaft, and the two ends of the single long rotating shaft are respectively rotatably connected to the two rear wheel installation frames.

Further, A front wheel installation frame is fixedly connected below the front end of the vehicle frame, the front wheel installation frame is a U-shaped installation frame, and two front wheel installation shafts are respectively connected to two sides of the U-shaped installation frame.

Further, A connecting rod is fixedly connected to the front wheel installation frame, and a reversible handle is hinged on the end of the connecting rod.

Further, A connecting rod is fixedly connected to the front wheel installation frame, and a retractable handle is hinged on the end of the connecting rod.

Further, a handle is arranged on the front end of the vehicle body for easily turning the vehicle body, a snap-fit buckle for connecting the vehicle frame is arranged below the handle, and a snap-fit plate is arranged on the vehicle frame corresponding to the snap-fit buckle, and the snap-fit plate is fixedly connected to the vehicle frame, the snap-fit buckle and snap-fit plate are detachably snap-fitted

Beneficial Effects

1. By setting the body rotation shaft just above the rear wheel installation shaft and below the vehicle frame plane, that is, the body rotation shaft is located between the vehicle frame and the rear wheel installation shaft, reducing the rotation center of gravity when the vehicle body is turned over, through simple structural changes to achieve the purpose of labor saving, to ensure that the rotation center is above the front wheel rotation axis, to avoid the rotation center of gravity is too low to affect the complete overturning of the vehicle body.

2. By setting the connecting plate, the connection area between the hinged structure and the vehicle body is increased, thereby reducing the wear of the vehicle body during long-term overturning and prolonging the service life of the dump truck; by setting the connecting frame, it is used to support the connecting plate and disperse the gravity of the vehicle body on the body rotation shaft, which prolongs the service life of the body rotation shaft.

3. By setting the V-shaped connecting frame with stable structure, and setting the body rotation shaft at the connection between the first straight rod and the connecting curved rod, the center of gravity of the vehicle body is shifted inside the triangle when the vehicle body is turned to the vertical state. In this way, the pressure of the vehicle body on the body rotation shaft is reduced, the service life of the body rotation shaft is prolonged, and at the same time, the center of gravity of the goods in the vehicle body is between the front and rear wheels during the overturning process, so as to avoid the suspension of the front wheel caused by the center of gravity exceeding the rear wheel.

Figure 1:
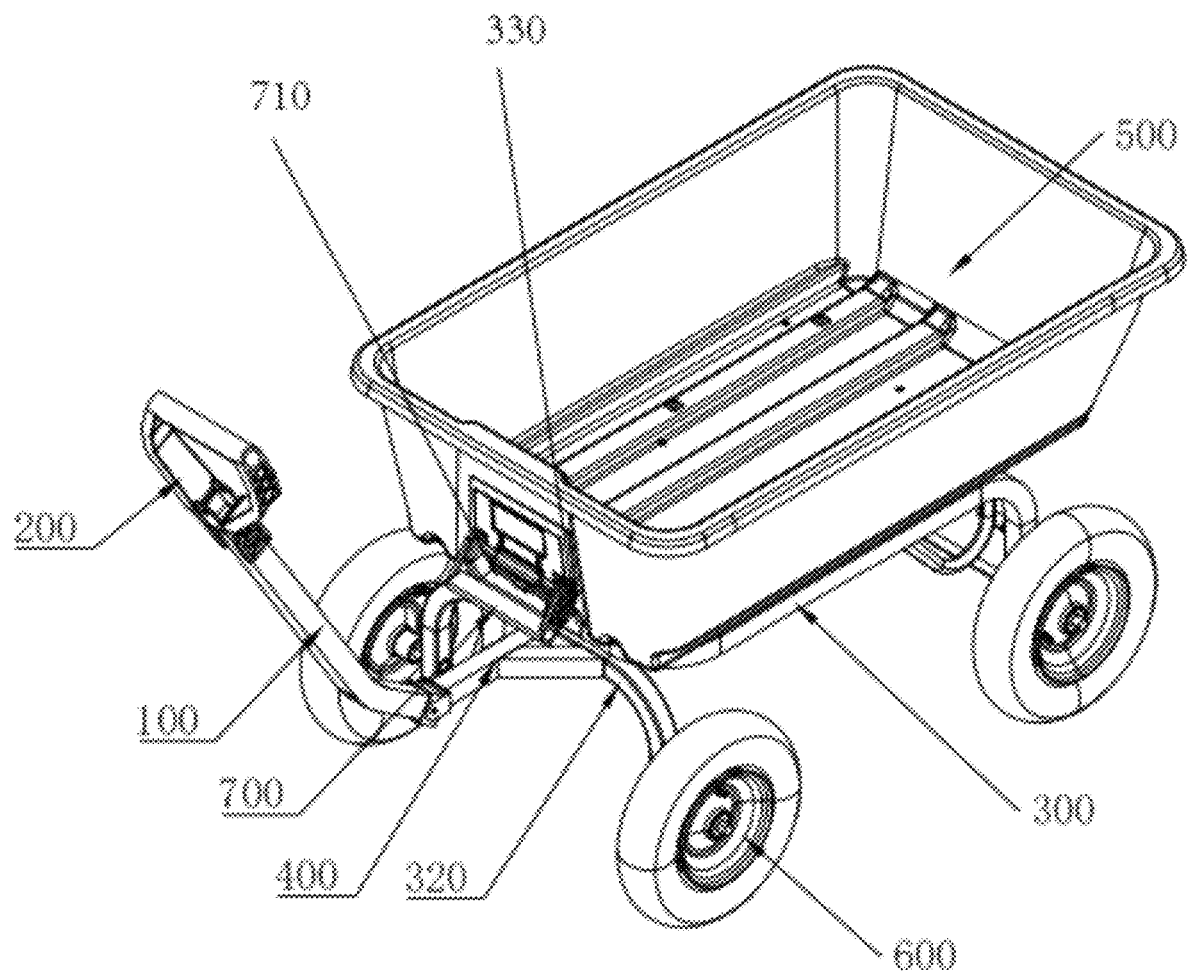
FIG. 1 is a structural schematic diagram of the new type of dump truck according to an embodiment 1 of the present disclosure.
Figure 2:
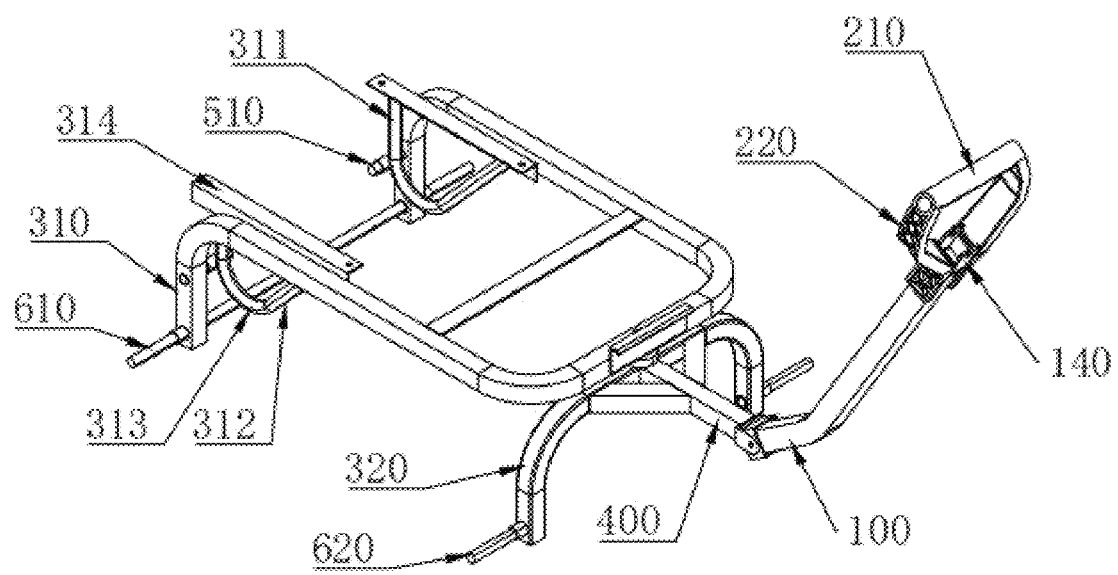
FIG. 2 is a structural schematic diagram of the new type of dump truck after removing the vehicle body and wheels according to the embodiment 1 of the present disclosure.
Figure 3:
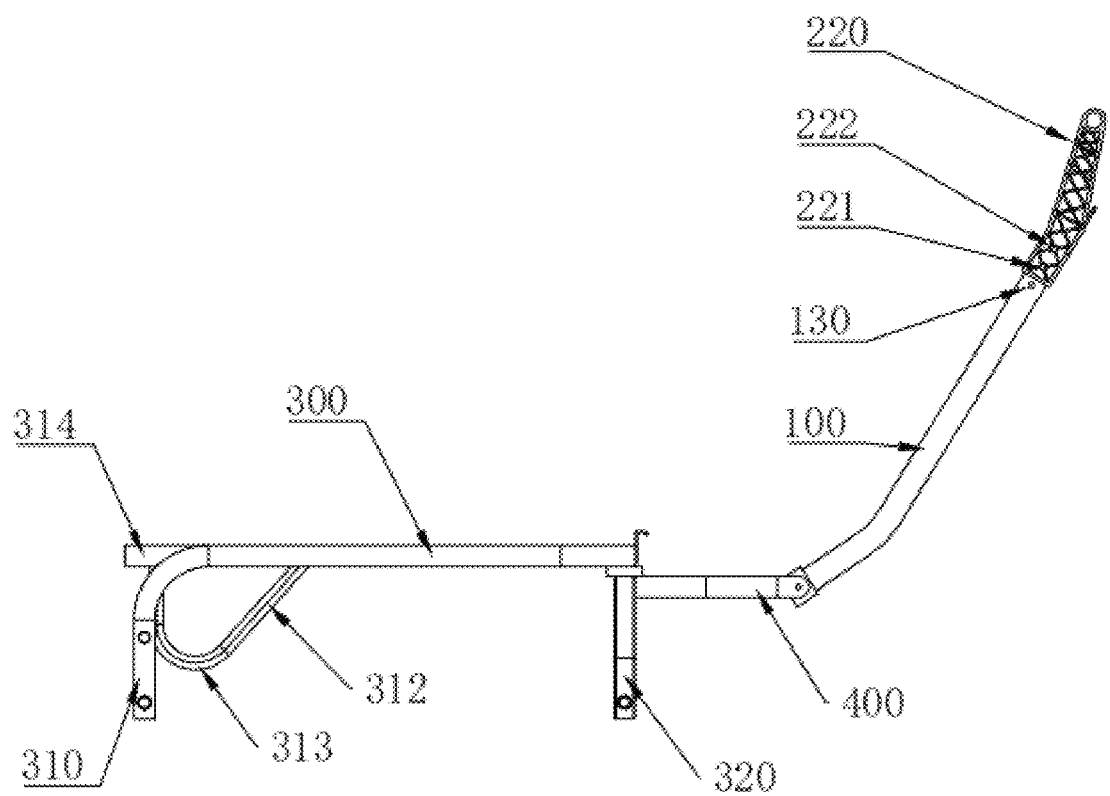
FIG. 3 is a left view structural schematic diagram of the new type of dump truck after removing the vehicle body and wheels according to the embodiment 1 of the present disclosure.
Figure 4:
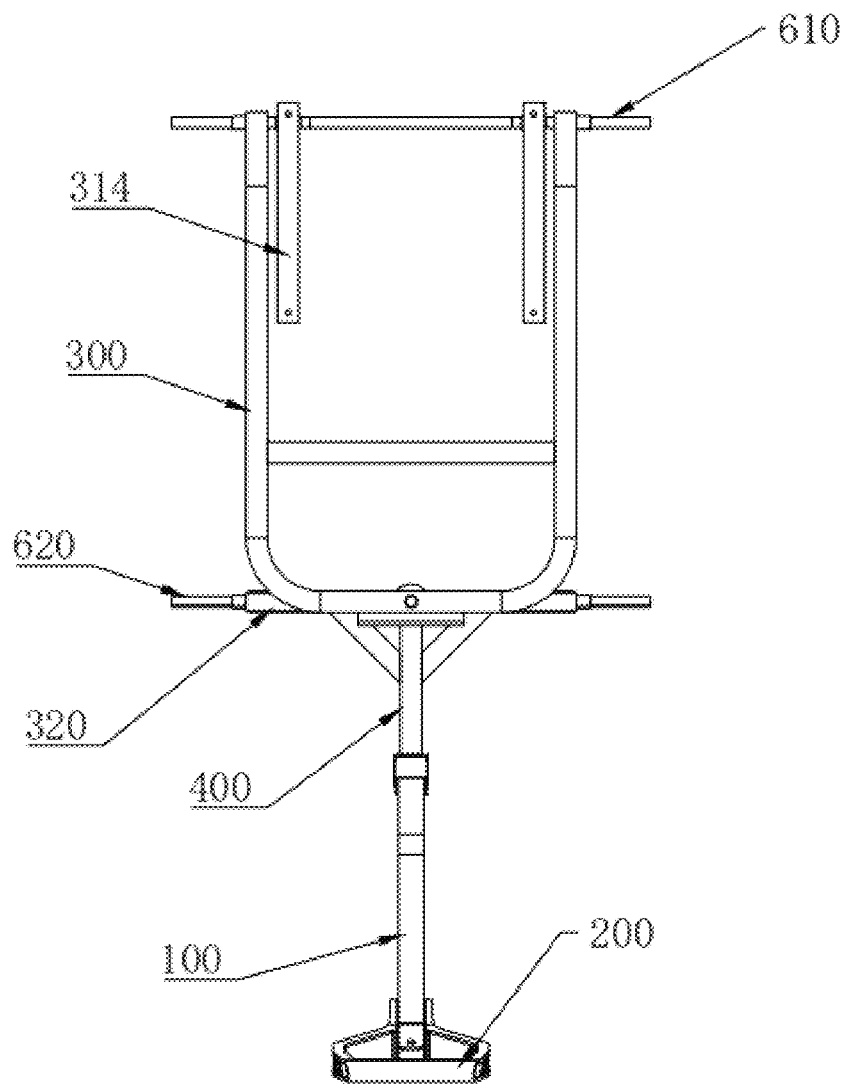
FIG. 4 is top view structural schematic diagram of the new type of dump truck after removing the vehicle body and wheels according to the embodiment 1 of the present disclosure.
Figure 5:
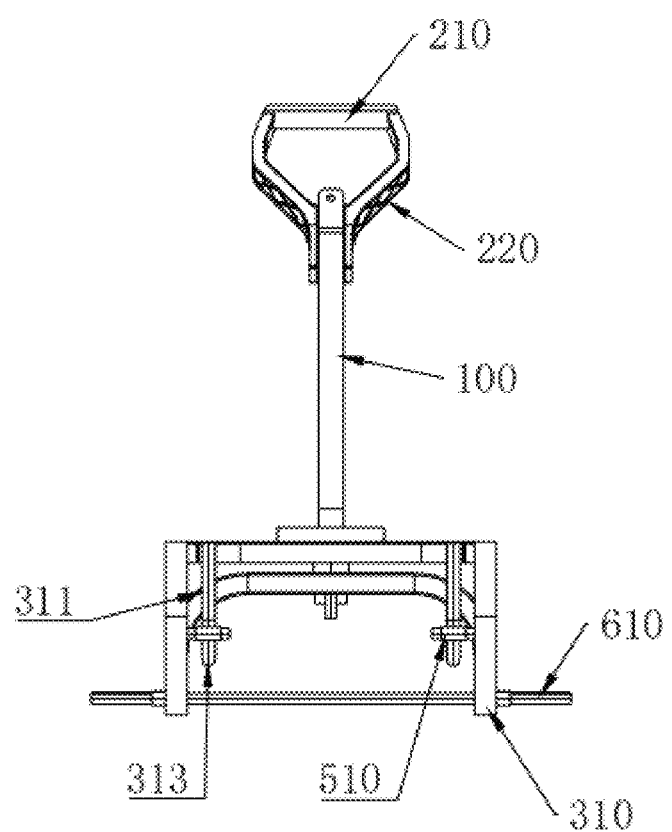
FIG. 5 is rear view structural schematic diagram of the new type of dump truck after removing the vehicle body and wheels according to the embodiment 1 of the present disclosure.
Figure 6:
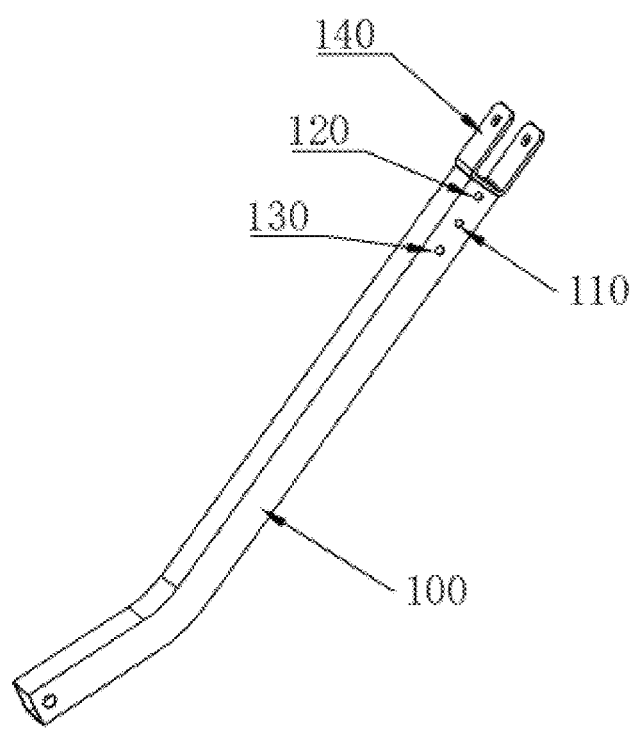
FIG. 6 is a structural schematic diagram of the extension rod of the reversible handle according to the embodiment 1 of the present disclosure.

In the figures: 100, extension rod; 110, first fixing hole; 120, second fixing hole; 130, third fixing hole; 140, connecting piece; 200, hand pull ring; 210, cross bar; 220, connecting arm; 221, first installation hole; 222, second installation hole; 300, vehicle frame; 310, rear wheel installation frame; 311, first straight rod; 312, second straight rod; 313, connecting curved rod; 314, connecting plate; 320, front wheel installation frame; 330, snap-fit buckle; 400, connecting rod; 500, vehicle body; 510, body rotation shaft; 600, wheel; 610, rear wheel installation shaft; 620, front wheel installation shaft; 700, handle; 710, snap-fit plate; 800, positioning installation hole; 900, limit rod.

DETAILED DESCRIPTION

In order to make those skilled in the art better understand the technical solutions of the present disclosure, the technical solutions of the present disclosure will be described clearly and completely below with reference to the accompanying drawings of the present disclosure. Other similar embodiments obtained by technical personnel without creative work shall fall within the protection scope of the present application. In addition, the directional terms mentioned in the following embodiments, such as "up", "down", "left", "right", etc. are only the directions of the drawings, so the directional terms used are used to illustrate rather than limit the present disclosure.

Embodiment 1

As shown in FIGS. 1-6, a new type of dump truck, includes a vehicle frame 300 and a vehicle body 500 hinged on the vehicle frame 300, a front wheel installation shaft 620 and a rear wheel installation shaft 610 respectively arranged on front and rear ends of the vehicle frame 300, and wheels 600 installed on the front wheel installation shaft 620 and the rear wheel installation shaft 610, a connecting plate 314 fixedly installed below the rear end of the vehicle body 500, and a body rotation shaft 510 fixed below the connecting plate 314, the connecting plate 314 and the vehicle frame 300 are rotatably connected through the body rotation shaft 510, and the body rotation shaft 510 is arranged directly above the rear wheel installation shaft 610. By setting the body rotation shaft 510 just above the rear wheel installation shaft 610 and below the vehicle frame 300 plane, that is, the body rotation shaft 510 is located between the vehicle frame 300 and the rear wheel installation shaft 610, reducing the rotation center of gravity when the vehicle body 500 is turned over, through simple structural changes to achieve the purpose of labor saving, to ensure that the rotation center is above the front wheel rotation axis, to avoid the rotation center of gravity is too low to affect the complete overturning of the vehicle body 500.

Further, a connecting frame is fixed below the connecting plate 314, the body rotation shaft 510 is arranged on the connecting frame, and the connecting plate 314 is connected with the body rotation shaft 510 through the connecting frame. Since the vehicle body 500 is usually made of plastic and other easily-wearable materials, by setting the connecting plate 314, the connection area between the hinged structure and the vehicle body 500 is increased, thereby reducing the wear of the vehicle body 500 during long-term overturning and prolonging the service life of the dump truck; by setting the connecting frame, it is used to support the connecting plate 314 and disperse the gravity of the vehicle body 500 on the body rotation shaft 510, which prolongs the service life of the body rotation shaft 510.

Further, the connecting frame is a V-shaped connecting frame, comprising a first straight rod 311 vertically arranged, an second straight rod 312 inclined arranged, and a connecting curved rod 313 connecting both ends of the first straight rod 311 and the second straight rod 312, the first straight rod 311, the connecting curved rod 313 and the second straight rod 312 are jointly enclosed to form the V-shaped connecting frame, and the body rotation shaft 510 is arranged at the connection between the first straight rod 311 and the connecting curved rod 313. By setting the V-shaped connecting frame with stable structure, and setting the body rotation shaft 510 at the connection between the first straight rod 311 and the connecting curved rod 313, the center of gravity of the vehicle body is shifted inside the triangle when the vehicle body 500 is turned to the vertical state. In this way, the pressure of the vehicle body 500 on the body rotation shaft 510 is reduced, the service life of the body rotation shaft 510 is prolonged, and at the same time, the center of gravity of the goods in the vehicle body 500 is between the front and rear wheels during the overturning process, so as to avoid the suspension of the front wheel caused by the center of gravity exceeding the rear wheel.

Further, the connecting plate 314 is two corner plates, and the two corner plates are respectively arranged above the rear wheel installation shaft. The corner plate has a simple structure, reduces the overall weight of the vehicle body, is easy to obtain materials, and has a low manufacturing cost.

Further, the rear end of the vehicle frame 300 extends downward to form two rear wheel installation frames 310, and the body rotation shaft 510 and the rear wheel installation shaft 610 are arranged up and down and mounted on the rear wheel installation frames 310. The rear wheel installation frame 310 is integrally designed with the vehicle frame 300 to ensure the structural strength of the rear wheel installation frame 310, and there is no need to add additional components for fixing the rear wheel installation frame 310, thereby reducing the cost of raw materials.

Further, the rear wheel installation shaft 610 is a single long rotating shaft, and the two ends of the single long rotating shaft are respectively rotatably connected to the two rear wheel installation frames 310. In addition to fixing the rear wheel, the long rotating shaft can also be connected with two rear wheel installation frames 310 to share the weight of the vehicle body 500 on the top vehicle frame 300.

Further, a front wheel installation frame 320 is fixedly connected below the front end of the vehicle frame 300, the front wheel installation frame 320 is a U-shaped installation frame, and two front wheel installation shafts 620 are respectively connected to two sides of the U-shaped installation frame. The bottom of the U-shaped installation frame is flush with the bottom of the rear wheel installation frame 310.

Further, a connecting rod 400 is fixedly connected to the front wheel installation frame 320, and a reversible handle is hinged on the end of the connecting rod 400. The connecting rod 400 is fixedly connected to the side of the U-shaped installation frame, and the reversible handle includes an extension rod 100 hinged on the connecting rod 400 and a hand pull ring 200 connected to the extension rod 100. The end of the hand pull ring 200 is reversibly connected with the end of the extension rod 100, and the end of the extension rod 100 is arranged with a connecting piece 140 for connecting a trailer. The extension rod 100 is arranged with a fixing hole, and an installation hole corresponding to the hand pull ring 200, and the extension rod 100 and the hand pull ring 200 are rotatably connected through a pin shaft passing through the installation hole and the fixing hole. By hinged connecting the hand pull ring 200 with the extension rod 100, the hand pull ring 200 can be rotated at the end of the extension rod 100 as needed, When the hand pull ring 200 needs to be manually pulled by hand, the hand pull ring 200 is turned outward, and when the vehicle needs to be hooked, the hand pull ring 200 is turned inward, thereby exposing the connecting piece 140, so that the connecting piece 140 is close to the vehicle to complete the quick conversion process. Further, the hand pull ring 200 is a U-shaped ring, and the openings at both ends of the U-shaped ring are hinged to both sides of the end of the extension rod 100 respectively. The reversible connection is realized by two pairs of fixing holes arranged up and down along the direction of the extension rod 100. The openings at both ends of the U-shaped ring are respectively provided with two pairs of installation holes corresponding to the two pairs of fixing holes, and the first pin shaft passes through the first installation hole 221 and the first fixing hole 110 below in turn, and then the U-shaped ring is hinged with the extension rod 100. Then, the second detachable pin shaft is passed through the second installation hole 222 and the second fixing hole 120 above in turn, and then the U-shaped ring is fixedly connected to the extension rod 100. The fixed connection between the U-shaped ring and the extension rod 100 is realized through the joint action of the first pin shaft and the second pin shaft. When it is necessary to pull the hand pull ring 200, just pull it directly. When it is necessary to hook the vehicle for use, after pulling out the detachable second pin, turn the U-shaped ring to make the connecting piece 140 located inside the U-shaped ring. It is exposed to facilitate the hooking of the vehicle. Preferably, the extension rod 100 is provided with three pairs of fixing holes, that is, the extension rod 100 is also provided with a third fixing hole 130, and the third fixing hole 130 is fixed below the first fixing hole 110 along the direction of the extension rod 100, after pulling out the second pin shaft and rotating the U-shape around the first pin shaft until the second installation hole 222 and the third fixing hole 130 coincide, then insert the second pin shaft, to realize the fixed storage of the hand pull ring 200. Further, the hand pull ring 200 includes a cross bar 210 for easy grasping and a connecting arm 220 for hinged connecting the cross bar 210 to the extension bar 100. There are two connecting arms 220, which are respectively fixedly connected to both side ends of the cross bar 210. The cross bar 210 and the connecting arm 220 are jointly enclosed to form a U-shaped ring. Further, the cross bar 210 is a cylindrical cross bar 210, and the interior of the cylindrical cross bar 210 is hollow. The cylindrical crossbar 210 is suitable for ergonomic design, easy to grasp, and has a hollow interior design, which reduces the weight of the crossbar 210, reduces the material used for the handle, and reduces the production cost of the enterprise without affecting the structural strength. Further, a reinforcing rib is provided on the outer side of the connecting arm 220. By setting the reinforcing ribs, the strength of the handle can be effectively improved, the amount of materials used can be reduced, and the production cost of the enterprise can be reduced. Further, the connecting arm 220 is a V-shaped connecting arm 220, and the included angle of the V-shaped connecting arm 220 is an obtuse angle. The V-shaped connecting arm 220 prevents the cross bar 210 from interfering with the extension bar 100 after being turned over, which affects the fixation of the second pin shaft and the third fixing hole 130. The connecting arm 220 and the cross bar 210 are jointly enclosed to form a teardrop-shaped hand pull ring 200 structure. The teardrop-shaped structure is not only beautiful, but also can withstand a large pulling force, and can effectively support both pushing force and pulling force. Further, the extension rod 100 is a hollow square tube. The square tube is convenient to increase the contact area between the extension rod 100 and the handle ring 200, provides greater support for the handle ring 200, and at the same time facilitates the handle ring 200 to be effectively fixed after being turned over. Further, the end of the extension rod 100 extends upward to form a connecting piece 140. The connecting piece 140 is arranged parallel to the installation plane of the hand pull ring 200. The connecting piece 140 and the extension rod 100 are integrally designed to increase the structural strength of the connecting piece 140 and facilitate the transmission of force between the connecting piece 140 and the extension rod 100. Further, the extension rod 100 is a V-shaped extension rod 100. The included angle of the V-shaped extension rod 100 is an obtuse angle, and the V-shaped extension rod 100 is set in accordance with the mechanical principle, which is convenient to push or pull the dump truck while keeping the wheels 600 on the ground, and at the same time, it can ensure that the dump truck can be pushed or pulled when the handle is tilted forward. May be close to the vehicle body 500 for easy storage.

Further, a handle 700 is arranged on the front end of the vehicle body 500 for easily turning the vehicle body 500, a snap-fit buckle 330 for connecting the vehicle frame 300 is arranged below the handle 700, and a snap-fit plate 710 is arranged on the vehicle frame 300 corresponding to the snap-fit buckle 330, and the snap-fit plate 710 is fixedly connected to the vehicle frame 300, the snap-fit buckle 330 and snap-fit plate 710 are detachably snap-fitted.

Embodiment 2

Figure 7:
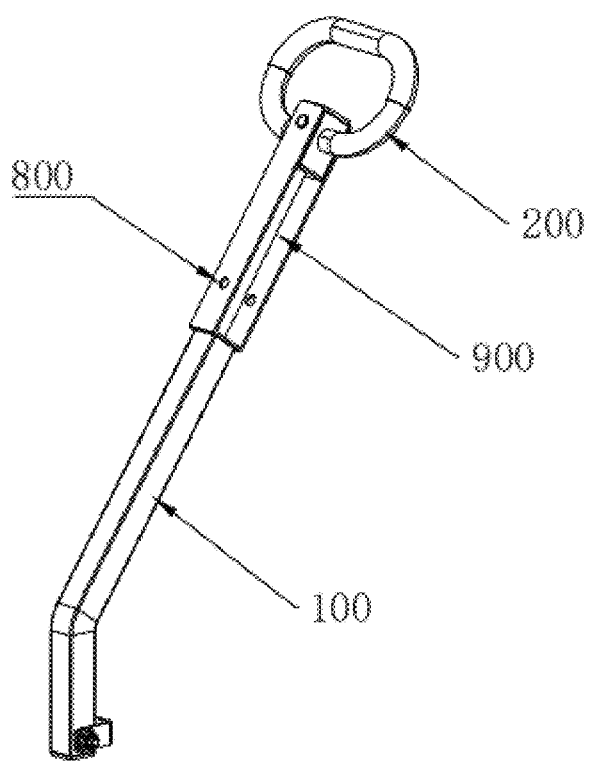
FIG. 7. is a structural schematic diagram of the retractable handle according to a embodiment 2 of the present disclosure.

The structure of the dump truck of this embodiment is basically the same as that of the embodiment 1, the only difference is that, as shown in FIG. 7, a connecting rod 400 is fixedly connected to the front wheel installation frame 320, a retractable handle is hinged at the end of the connecting rod 400. The retractable handle includes an extension rod 100 hinged to the end of the connecting rod 400 and a hand pull ring 200 connected to the extension rod 100. The connecting rod 400 is horizontally fixed on the side of the front end of the vehicle frame 300 or the side of the front wheel frame. The other end of the connecting rod 400 is hinged with one end of the extension rod 100. The extension rod 100 is a V-shaped rod, which is suitable for the push and pull of people of different heights, and is convenient at the same time. For storage, the other end of the extension rod 100 is detachably and fixedly connected with a hand pull ring 200, which is convenient for grasping and improves the comfort of pushing and pulling person. A positioning hole is provided under the hand pull ring 200, a positioning installation hole 800 is disposed on the extension rod 100, and the third pin shaft passes through the positioning installation hole 800 and the positioning hole to detachably fix the hand pull ring 200 on the extension rod 100. Further, two sets of positioning installation holes 800 are provided on the extension rod 100 at intervals, and the distance between the two sets of positioning installation holes 800 is not less than the height of the hand pull ring 200. Each set of positioning installation holes 800 includes two positioning installation holes 800 opposite to both sides of the extension rod 100. When the hand pull ring 200 is fixed in the positioning installation holes 800 above through the third pin, the hand-pull ring 200 is located at the end of the extension rod 100 and higher than the extension rod 100, which is convenient for manual push and pull. When the hand pull ring 200 is fixed in the positioning and installation hole 800 below through the third pin, the hand pull ring 200 is located in the extension inside the rod 100, and the positioning installation holes 800 above it are higher than the highest point of the hand pull ring 200, which is convenient for hooking and pulling the trailer. Therefore, two sets of positioning installation holes 800 and a detachable fixed hand pull ring 200 improves the scope of application of the push-pull method of the dump truck. Further, the bottom of the hand pull ring 200 is fixedly connected with a limit rod 900, a limit hole is provided in the corresponding extension rod 100, and the limit rod 900 extends into the limit hole so that the hand pull ring 200 is slidably connected to the extension rod 100. By arranging the limit rod 900 and the limit hole which are slidably connected, it is convenient to quickly change the position of the hand pull ring 200, and the installation efficiency is improved.

The present disclosure has been described in detail above. The above descriptions are only preferred embodiments of the present disclosure, and should not limit the scope of implementation of the present disclosure. It still falls within the scope of the present disclosure.

What is claimed is:

1. A dump truck, comprising: a vehicle frame and a vehicle body hinged on the vehicle frame, a front wheel installation shaft and a rear wheel installation shaft respectively arranged on front and rear ends of the vehicle frame, and wheels installed on the front wheel installation shaft and the rear wheel installation shaft, a connecting plate fixedly installed below the rear end of the vehicle body, and a body rotation shaft fixed below the connecting plate, the connecting plate and the vehicle frame are rotatably connected through the body rotation shaft, and the body rotation shaft is arranged directly above the rear wheel installation shaft;

wherein a connecting frame is fixed below the connecting plate, the body rotation shaft is arranged on the connecting frame, and the connecting plate is connected with the body rotation shaft through the connecting frame.

2. The dump truck according to claim 1, wherein the connecting frame is a V-shaped connecting frame, comprising a first straight rod vertically arranged, a second straight rod inclined arranged, and a connecting curved rod connecting both ends of the first straight rod and the second straight rod, the first straight rod, the connecting curved rod and the second straight rod are jointly enclosed to form the V-shaped connecting frame, and the body rotation shaft is arranged at a connection between the first straight rod and the connecting curved rod.

3. The dump truck according to claim 1, wherein the connecting plate is two corner plates, and the two corner plates are respectively arranged above the rear wheel installation shaft.

4. The dump truck according to claim 1, wherein a rear end of the vehicle frame extends downward to form two rear wheel installation frames, and the body rotation shaft and the rear wheel installation shaft are vertically arranged and mounted on the two rear wheel installation frames.

5. The dump truck according to claim 4, wherein the rear wheel installation shaft is a single long rotating shaft, and the two ends of the single long rotating shaft are respectively rotatably connected to the two rear wheel installation frames.

6. The dump truck according to claim 1, wherein a front wheel installation frame is fixedly connected below the front end of the vehicle frame, the front wheel installation frame is a U-shaped installation frame, and two front wheel installation shafts are respectively connected to two sides of the U-shaped installation frame.

7. The dump truck according to claim 6, wherein a connecting rod is fixedly connected to the front wheel installation frame, and a reversible handle is hinged on the end of the connecting rod.

8. The dump truck according to claim 6, wherein a connecting rod is fixedly connected to the front wheel installation frame, and a retractable handle is hinged on the end of the connecting rod.

9. The dump truck according to claim 1, wherein a handle is arranged on the front end of the vehicle body for easily turning the vehicle body, a snap-fit buckle for connecting the vehicle frame is arranged below the handle, and a snap-fit plate is arranged on the vehicle frame corresponding to the snap-fit buckle, and the snap-fit plate is fixedly connected to the vehicle frame, the snap-fit buckle and snap-fit plate are detachably snap-fitted.

\* \* \* \* \*